United States Patent [19]

Corner

[11] Patent Number: 5,288,471
[45] Date of Patent: Feb. 22, 1994

[54] APPARATUS FOR PRESERVING BIOLOGICAL PRODUCTS

[75] Inventor: Antonio Corner, Thiene, Italy

[73] Assignee: Officine de Cartigliano S.p.A., Thiene, Italy

[21] Appl. No.: 912,837

[22] Filed: Jul. 13, 1992

[51] Int. Cl.$^5$ .................. A23C 3/07; A23L 3/005; B01J 19/12; H05B 6/00
[52] U.S. Cl. .................... 422/307; 99/451; 99/453; 219/772; 392/481; 422/22; 422/905; 426/244
[58] Field of Search .......... 422/22, 307, 905; 426/244; 219/10.51, 10.65; 392/481; 99/451, 453

[56] References Cited

U.S. PATENT DOCUMENTS

| | | | |
|---|---|---|---|
| 1,522,188 | 11/1923 | Hull | 99/453 |
| 2,508,365 | 5/1950 | Bierwirth | 219/10.41 |
| 2,550,584 | 4/1951 | Mittelmann | 99/451 |
| 2,576,862 | 11/1951 | Smith et al. | 99/362 |
| 3,272,636 | 9/1966 | Fehr et al. | 426/234 |
| 3,934,042 | 1/1976 | DeStoute | 99/453 |
| 4,880,648 | 11/1989 | Stamer | 426/241 |

FOREIGN PATENT DOCUMENTS

| | | |
|---|---|---|
| 2628234 | 1/1978 | Fed. Rep. of Germany . |
| 2547732 | 6/1983 | France . |
| 2-21185 | 8/2390 | Japan . |
| 9200764 | 1/1992 | World Int. Prop. O. ............ 422/22 |

Primary Examiner—Robert J. Warden
Assistant Examiner—L. M. Crawford
Attorney, Agent, or Firm—Wolf, Greenfield & Sacks

[57] ABSTRACT

The method includes the steps of: preheating a selected volume of product to a temperature proximate to the maximum temperature of the treatment; irradiating the product with an alternating electromagnetic field in order to heat the product to approximately 50° C.; maintaining the product at a substantially constant temperature for a set time; cooling the product to a temperature close to the packaging temperature. An apparatus for performing the above method includes a pair of facing emitting surfaces connected to the terminals of an oscillator operating below 1 GHz and set to heat the product to a maximum temperature of approximately 50° C. The apparatus also includes a thermally insulated region to maintain the product at the maximum temperature of the treatment for a selected time adapted to ensure the complete destruction of the bacterial and sporal loads.

8 Claims, 3 Drawing Sheets

APPARATUS FOR PRESERVING BIOLOGICAL PRODUCTS

FIELD OF THE INVENTION

The present invention relates to a method and an apparatus for sterilizing and/or pasteurizing non-packaged biological products, containing bacterial and sporal loads, particularly in the liquid or viscous state, in order to extend their shelf life.

The biological products involved are mainly constituted by food of animal or vegetable origin, such as milk and its by-products, eggs, creams, wine, fruit juices and pulps, and preserves prior to their packaging in appropriate containers or packages. However, non-alimentary biological compounds, for example for pharmacological and medical use, such as serum, blood and hemoderivatives in the loose state, prior to their packaging, may also be preserved according to the present invention.

The main components of the above mentioned biological products, and in particular of the alimentary ones, comprise water, sugars, mineral salts, fats, vitamins, biochemical compounds, such as enzymes, antibodies and hormones, together with biological components of microbial and viral origin. For example, milk is an emulsified solution of lactose, casein, fats and of some mineral salts in a water content of over 85%. Pathogenic microorganisms present in this food constitute the so-called bacterial flora, which comprises, among others, Microbacterium tuberculosis and a wide range of viruses, including the poliomyelitis virus.

BACKGROUND OF THE INVENTION

The problem which must be solved by means of the sterilization and/or pasteurization of these products essentially consists in attenuating the pathogenic and enzyme activity of the micro-organisms while respecting the active principles which determine the original organic and organoleptic properties.

Known preservation methods used on an industrial scale are of the physical, chemical-physical, chemical and biological types. In particular, physical methods comprise refrigeration, heat transmission or drying.

Among the above mentioned methods, processes based on the application of heat are by far the most valid and widespread in solving the above mentioned problems. Heat application conditions depend not only on the type of product to be treated but also on the types of micro-organism contained therein and finally on the simultaneous use or non-use of other preservation processes. The degree of heat resistance of the micro-organisms must be related both to external and environmental factors, such as the initial microbial concentration of the medium, the characteristics of said medium and the time and temperature parameters, and to intrinsic factors, such as the heat resistance of the germs.

Sterilization destroys all of the micro-organisms present in the products by heating the product up to temperatures between 65° and 121° C. for a time between 5 and 12 minutes.

Pasteurization comprises a moderate heat treatment in order to destroy most, but not all, of the bacterial flora by using temperatures below 100° C., generally between 60° and 75° C.

In both cases, the temperature and duration of the heat treatment depend on the heat application method and on the type of product. Furthermore, at the end of the treatment the product must be subjected to the fastest possible cooling down to temperatures below 35° C. before being introduced in sterilized containers.

In the sterilization process as well as in the pasteurization process, heat can be applied with an indirect exchange, in which the product and the heating medium are separated by the wall of an exchanger, or with a direct one, in which the product and the heating medium are in direct contact.

Current thermal preservation methods are the most important from the industrial point of view, but they have some problems.

In order to increase the effectiveness of sterilization, it is in fact necessary to raise the maximum temperature of the process, with the consequence of damaging the product from the organoleptic point of view, sometimes giving it a cooked or burnt taste or reducing its natural taste and aroma. In non-alimentary products, high temperatures can destroy essential enzymes and proteins.

Furthermore, in indirect-transmission systems the heat is transmitted from outside inward, so that it is necessary to increase the temperature of the exchange surface in order to destroy the micro-organisms even in the innermost regions. This can produce a partial non-uniformity and ineffectiveness of the process.

In direct-exchange systems, the heating medium is generally constituted by steam, which has the disadvantage of condensing inside the product itself.

Electronic preservation apparatuses having no exchange surfaces have recently been provided and are based on the following principle.

As is known, micro-organisms, like all living organisms, are poor heat and electrical conductors. Because of this, the application of heat to these organisms is difficult and slow, and also occurs unevenly. In practice, due to their low electrical conductivity, micro-organisms behave like dielectric particles which align in an external magnetic field.

FIGS. 1a and 1b schematically illustrate the structure of a pathogenic micro-organism A, for example constituted by a unicellular organism which has a generally spherical shape, when it is not subjected to any magnetic or electric field. If the micro-organism A is placed between the pates B and C of a capacitor suitable for generating an electric field with lines of force which are substantially perpendicular to the surfaces of said plates, it is observed that its approximately circular contour deforms and assumes the configuration A' due to the migration of charges with opposite signs toward its ends. Therefore, part of the energy of the field is transferred to the micro-organism as deformation work and part is transformed into kinetic energy, which increases the micro-organism's molecular agitation and therefore its temperature. Collisions due to molecular agitation and the deformation work tend to weaken or break the atomic bonds of the molecules of the microorganism A, altering its structure irreversibly. In FIG. 1b, the orientation of the electric field generated by the plates B and C is reversed, and consequently the molecular dipole also undergoes a change in shape and orientation, assuming the configuration A" which is symmetrical to the preceding one. High-frequency oscillation of the electric field generated by the plates B and C therefore produces corresponding structural modifications of the molecules of the pathogenic microorganisms, accompanied by mild heating, causing their complete degeneration at certain resonance frequencies.

By using the above described physical principle, electronic preservation methods entail the immersion of the product in a high-frequency alternating electric or electromagnetic field for a time sufficient to cause the structural degeneration of the pathogenic microorganisms.

The Japanese patent application, publication No. 2-211855 filed on Feb. 10, 1989, describes a method and an apparatus for sterilizing an alimentary liquid by irradiation with high-frequency electromagnetic waves.

In this known method, the radiation is constituted by microwaves at frequencies higher than 1 GHz emitted by a magnetron oscillator and are transmitted axially inside a waveguide, with very short irradiation times in the range of a few seconds. Due to the high frequency and to the limited wavelength of the electromagnetic waves, shielding is necessary in order to protect the personnel that works in the neighboring area. The intense heating caused by the microwaves furthermore makes it necessary to perform extremely short treatments in rapid succession, each of which is followed by intense cooling in order to keep the product below the temperature at which its organic and organoleptic properties change.

U.S. Pat. Nos. 2,576,862 and 3,272,636, FR-A-2 547 732 and DE-A-2 628 234 describe other methods and apparatuses which use electromagnetic waves with frequencies comprised within the ranges of microwaves and/or radio frequencies. These known methods and apparatuses are applied to already-packaged products and always require appropriate shielding against emissions which are harmful to the human body.

Furthermore, since the destructive action of the alternating electromagnetic field affects not only the pathogenic microorganisms but also the active principles which determine the organoleptic properties of the products to be preserved, these known methods and apparatuses change said organoleptic properties, reducing the value of the active principles.

SUMMARY OF THE INVENTION

The method includes the steps of: preheating a selected volume of product to a temperature proximate to the maximum temperature of the treatment; irradiating the product with an alternating electromagnetic field in order to heat the product to approximately 50° C.; maintaining the product at a substantially constant temperature for a set time; cooling the product to a temperature close to the packaging temperature.

An apparatus for performing the above method includes a pair of facing emitting surfaces connected to the terminals of an oscillator operating below 1 GHz and set to heat the product to a maximum temperature of approximately 50° C. The apparatus also includes a thermally insulated region to maintain the product at the maximum temperature of the treatment for a selected time adapted to ensure the complete destruction of the bacterial and sporal loads.

The aim of the present invention is to obviate the problems described above by providing a method and an apparatus for the continuous sterilization and/or pasteurization of non-packaged biological alimentary and non-alimentary products, particularly in the liquid or viscous state, which allows complete and uniform preservation in conditions of high reliability, leaving the organic and organoleptic properties of the treated products unchanged.

A further object is to provide a method and an apparatus which do not require the use of specific shielding, so that they can be used in combination with, or in replacement of, conventional thermal apparatuses.

Another object of the present invention is to provide an apparatus which is constructively simple and economical, so as to be affordable even for small user or producer companies.

This aim, these objects and others which will become apparent hereinafter are achieved by a method and an apparatus respectively according to claims 1 and 5.

The method and apparatus according to the invention obtain sterilization and/or pasteurization at temperatures which are assuredly lower than the survival temperatures of the active principles which determine the organoleptic properties of the treated products.

Furthermore, by means of an apparatus according to the invention, the preservation of the products is absolutely uniform, regardless of whether the process is performed continuously or discontinuously.

Further characteristics and advantages will become apparent from the detailed description of a method and a device according to the invention, illustrated only by way of non-limitative example in the accompanying drawings.

The method according to the invention is applied continuously to a given volume or to a given flow rate of product which contains bacterial or sporal loads.

DESCRIPTION OF SPECIFIC EMBODIMENTS

The method comprises a first step of preheating of the product with conventional thermal methods up to a temperature proximate to the treatment's maximum temperature, for example between 40° C. and 45° C., followed by a step of irradiation with an electromagnetic field. In particular, the field is generated in an open space comprised between a pair of facing emitting surfaces which are connected to the terminals of an oscillator which operates in the range of radio frequencies below 1 GHz. The radiant energy E and the irradiation time $t_i$ are chosen so as to raise the product to a maximum temperature of approximately 50° C., such as to not alter the organic and organoleptic qualities of the product.

This is followed by a step of maintenance of the product for a time $t_s$ at a substantially constant temperature which is equal to the maximum temperature of the process, in order to allow the complete destruction of the micro-organisms contained in said product.

The product is finally subjected to a step of cooling down to temperatures suitable for its packaging in sterile conditions.

Figure 1A:
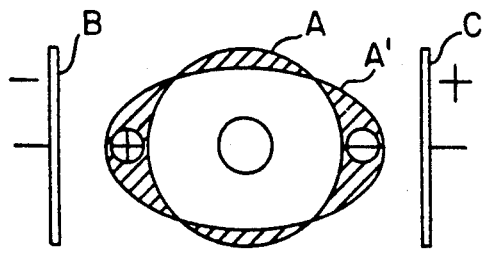
FIGS. 1a and 1b schematically illustrate the structure of a pathogenic micro organism.
Figure 1B:
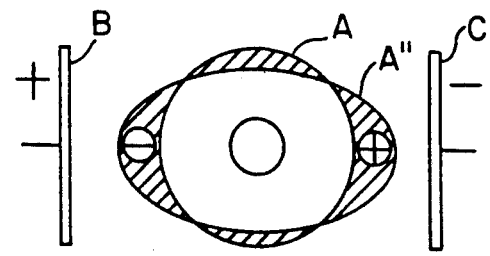
Figure 2:
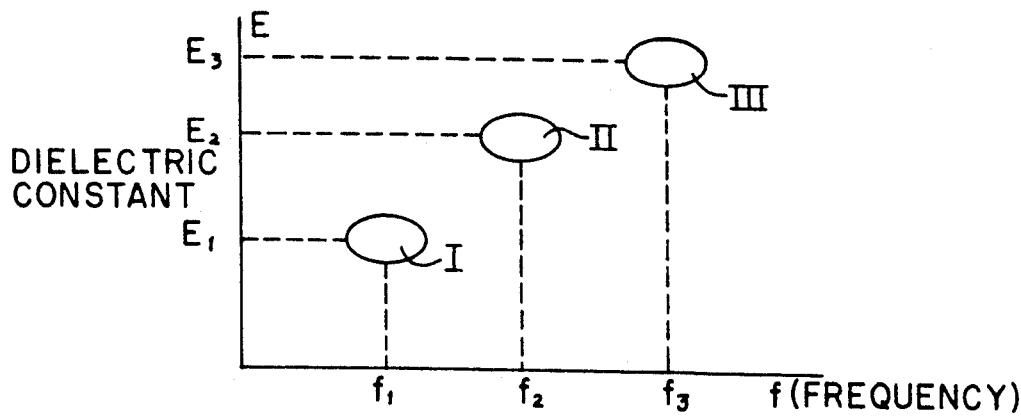
FIG. 2 is a qualitative diagram of the correlation between the relative dielectric constants of the components present in the products to be preserved and the corresponding resonance frequencies of the alternating electromagnetic field.

FIG. 2 qualitatively indicates the correlation between the electrical conductivity of the groups of organisms contained in the products and their resonance frequencies. Groups of coliform bacteria, sporogenous bacteria and proteins, respectively designated by I, II and III, which have relative dielectric constants $\epsilon 1$, $\epsilon 2$, $\epsilon 3$, are matched by resonance frequencies f1, f2 and f3. By using an alternating field with frequencies lower than the protein resonance frequencies, it is possible to ensure the constancy of the organic and organoleptic properties of the products to be preserved. Tests and examinations have shown that the most suitable frequencies are radio frequencies comprised between 6 MHz and 1 GHz, the use of which is allowed by currently applicable international statutory provisions for industrial radio-frequency heaters. The best results have been obtained with frequencies comprised between 6 MHz and 915 MHz. The best results for each individual product are naturally obtained at a very specific frequency. For example, excellent results are obtained for milk with frequencies around 27 MHz.

The specific energy of the electromagnetic field required to cause a $\delta T$ of less than 10° C., including the unavoidable dispersions for current transformation and for the auxiliary equipment, can be between 0.01 KW/l (10 KW/m$^3$) and 0.10 KW/l (100 KW/m$^3$). It should preferably be between 0.02 KW/l (20 KW/m$^3$) and 0.04 KW/l (40 KW/m$^3$).

Preservation may optionally be performed in a plurality of repeated steps or passes, performing intermediate coolings between the successive passes.

In a practical case, by preheating a flow-rate of milk of approximately 1000 l/h to approximately 40° C. and irradiating it with radio waves at a frequency of 27 MHz and with an energy of 15 KW for an exposure time $t_i$ of approximately 25 seconds until its final temperature rose to 50° C., and by subsequently maintaining the product at a constant temperature of approximately 50° C. for approximately 30 seconds, it has been possible to achieve the complete destruction of the bacterial flora and of the main pathogenic viruses, leaving the organic and organoleptic properties of the treated product absolutely unchanged.

Figure 3:
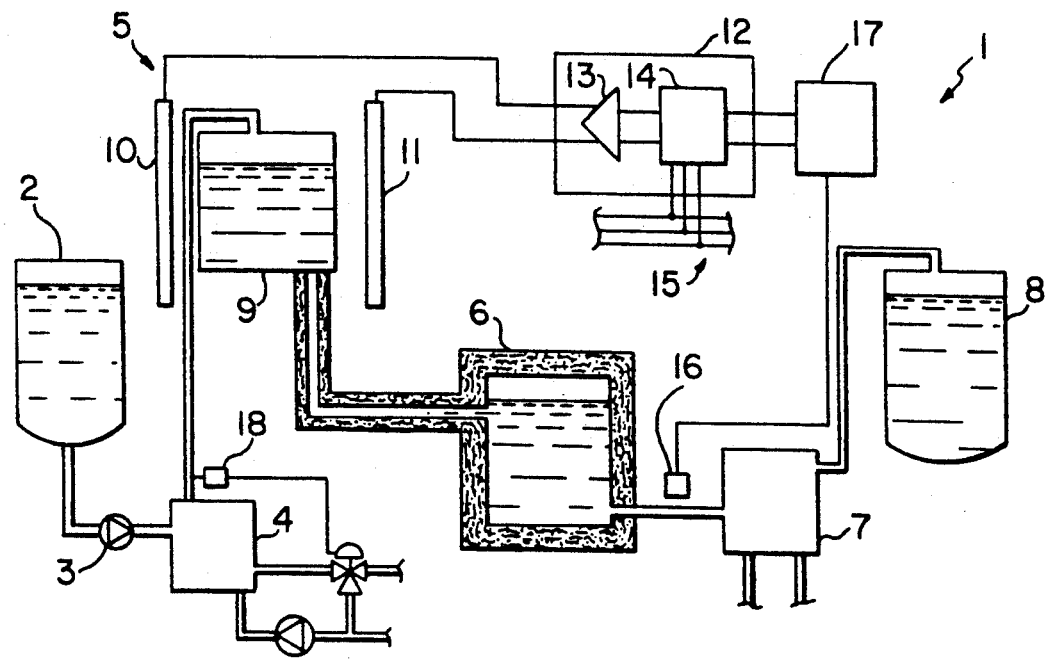
FIG. 3 is a schematic view of a first embodiment of an apparatus according to the invention.

FIG. 3 illustrates a first embodiment of an apparatus for performing the method described above.

The apparatus, generally designated by the reference numeral 1, comprises a certain number of elements arranged in series along a hydraulic circuit, constituted by a tank 2 for the product to be treated, a pump 3, a preheater 4, an irradiation section 5, an insulated maintenance vessel 6, a cooling unit 7 and a tank 8 for collecting the treated product.

In particular, the irradiation section is constituted by a container 9 which is used to confine a certain amount of product between a pair of planar plates 10 and 11 which are connected to the terminals of a source 12 of electromagnetic waves. Said source, according to a per se known technology which is not a subject of the present invention, comprises a triode oscillator 13 and a power and amplifier circuit 14 supplied by an external electric power line 15. Downstream of the container 9, a temperature detector 16 sends a signal to an electronic control unit 17. By means of control unit 17, it is possible to adjust irradiation power and time according to the final temperature of the product. A further probe 18 is arranged after the preheater 4. Probe 18 is used to control the temperature of the product before it is sent to the irradiation section.

In this manner, the adjustment of the apparatus occurs automatically, so as to obtain the complete destruction of the micro-organisms contained in the product, according to the final temperature after irradiation.

Figure 4:
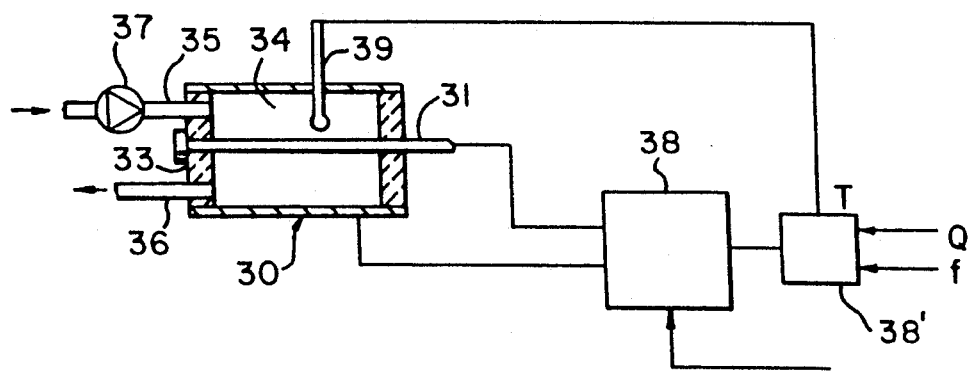
FIG. 4 is a schematic view of a detail of a second embodiment of the apparatus according to the invention.

FIG. 4 schematically illustrates the irradiation section of a second embodiment of an apparatus according to the invention.

In particular, the plates of the capacitor are constituted respectively by an external cylinder 30 and by a central electrode 31, wherein the two elements are kept in coaxial position by means of terminal insulating walls 32 and 33 so as to define a torus interspace 34. The product to be treated is fed into the chamber 34 through inlet and discharge ducts, respectively designated by 35 and 36, by means of a circulator 37. The radio-frequency source, includes a wave generator 38 and a control unit 38' responsive to a signal T transduced by a temperature probe 39 and to signals f (frequency) and Q (volumetric flow rate) that are selected for the product under treatment.

Figure 5:
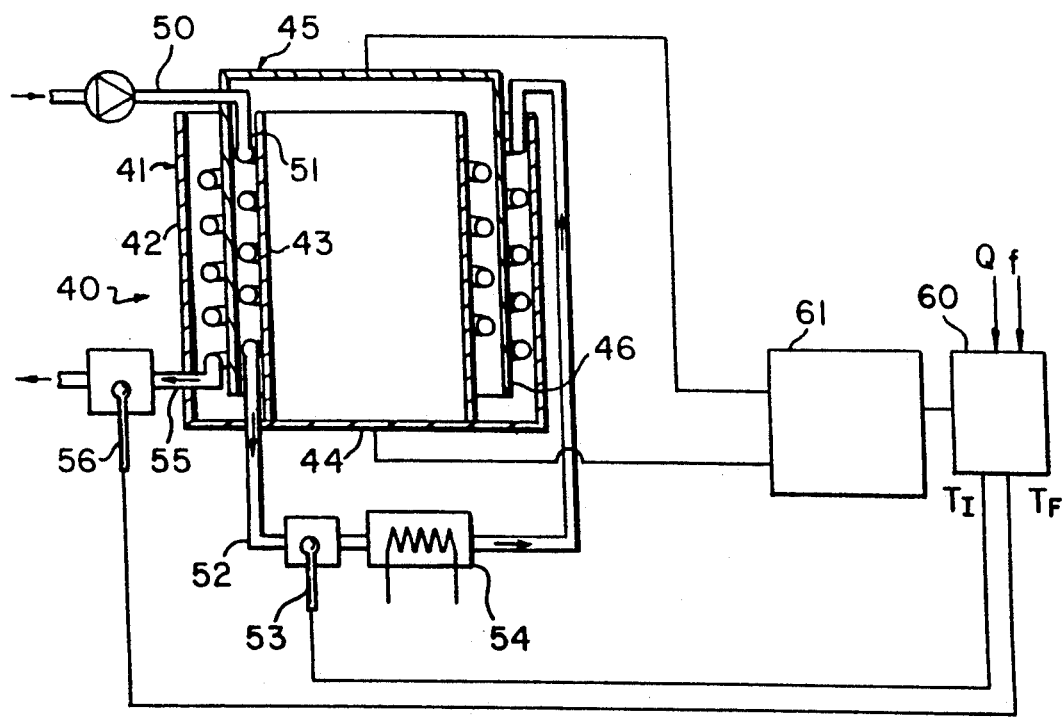
FIG. 5 is a view of a detail of a third embodiment of the apparatus according to the invention.

FIG. 5 illustrates another type of irradiation section according to the invention, generally designated by the reference numeral 40. Said section substantially consists of a lower plate 41 which has a pair of coaxial cylindrical walls 42 and 43 which are mutually connected by a planar lower wall 44 and by an upper plate 45. Upper plate 45 has a cylindrical wall 46 arranged coaxially to the cylindrical walls 42 and 43 of the lower plate 41. A coiled tube 50, with an inlet 51 and an outlet 52, is inserted in the interspace defined between the wall 46 of the upper plate and the wall 42 of the lower plate. A heat probe 53 and a cooling unit 54 are arranged in the portion 52 of the tube. After said cooling unit, the tube 50 enters the interspace defined between the wall 41 of the lower plate 44 and the wall 46 of the upper plate 45, forming a second coiled portion with an outlet section 55 provided with a heat probe 56. The temperature values detected by the probes 53 and 56 are sent to the control unit 60 in order to adjust the radio-frequency source 61, similarly to what has been described above.

The tube 50 is made of a dielectric material which is transparent to electromagnetic waves in order to limit the absorption of energy of the oscillating electromagnetic field, and is chosen so that it has a relative dielectric, constant which is lower than that of the active principles which determine the organic and organoleptic characteristics of the product to be preserved. Thus, the tube 50 constitutes a shield with regard to the resonance frequencies of said active principles, protecting the latter against the destructive effects of the field.

In this case, the preservation process can be performed in two stages, separated by an intermediate cooling step performed by means of the exchanger 54, in order to limit the maximum temperature of the process.

Figure 6:
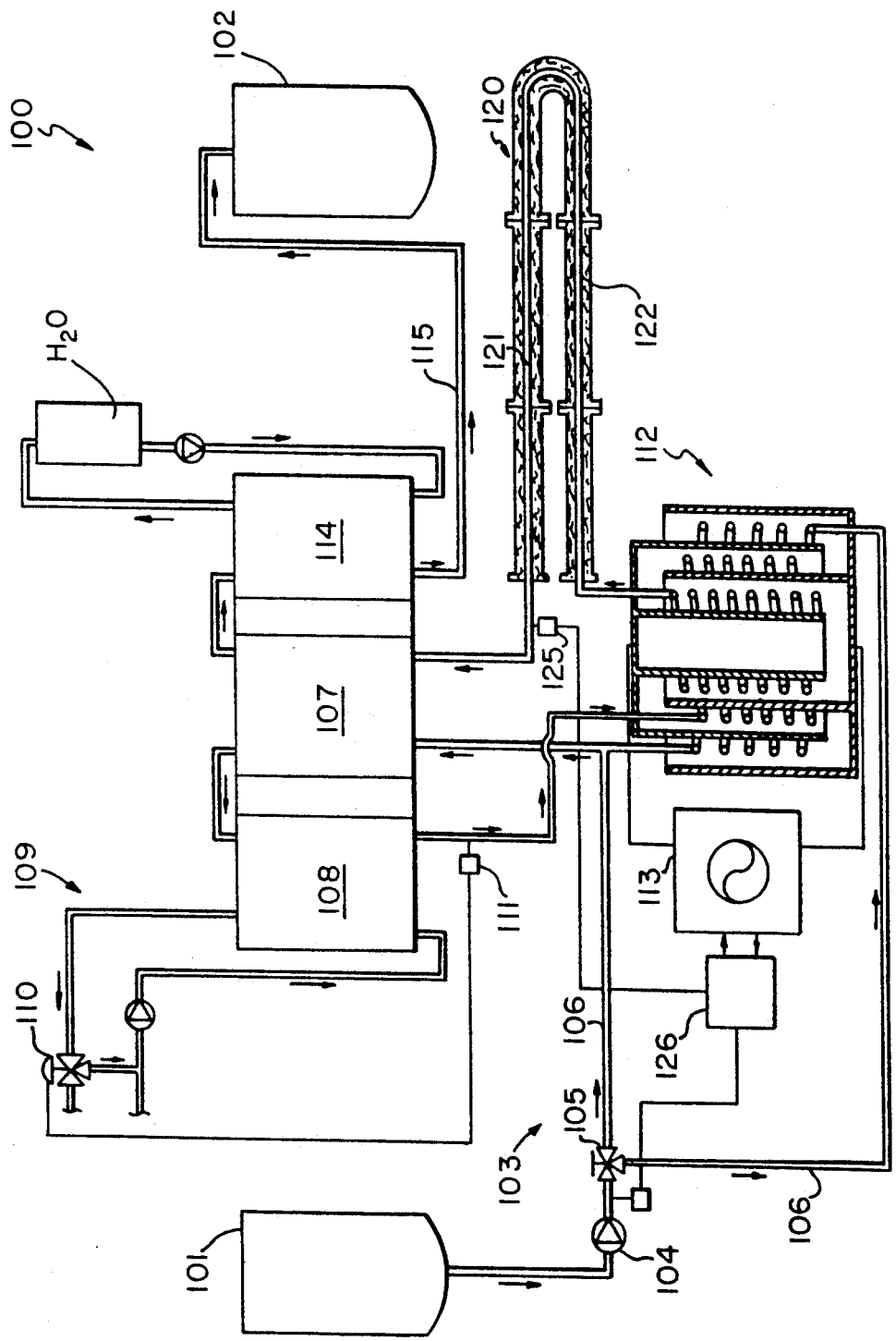
FIG. 6 is a view of a further embodiment of the apparatus according to the invention.

FIG. 6 schematically shows a further embodiment of a continuous apparatus according to the invention, generally designated by the reference numeral 100.

Said apparatus comprises a tank 101, for example made of stainless steel, for storing the product to be treated. Tank 101 is connected to a container 102, similar to the preceding one shown in FIG. 3, for collecting the treated product by means of a hydraulic circuit, generally designated by the reference numeral 103. A variable-delivery pump 104 is arranged in series to the tank 101. A shunt valve 105 allows the product contained in the tank 101 to be conveyed through the pipe 106 of the circuit toward the primary circuit of a preheater 107, for example having heat exchange surface of the plate type with heating and heated fluids opposite directions, and, which uses the heated product itself as heating fluid.

After the preheater 107 there is a heater 108 which is similar to the preceding one but uses, as heating fluid, water at a temperature of approximately 85° C. contained in an external circuit 109 which is provided with an electrically operated bypass valve 110. A temperature detector 111 is provided at the output of the heater 108 and acts upon the valve 110 so as to keep the temperature of the product below the maximum temperature of the process (50° C.) and in any case below the temperature at which the active principles which determine the organic and organoleptic properties of the product degenerate.

After the preheater 108 there is an irradiation section, generally designated by the reference numeral 112, having a cylindrical symmetry with one open end and one closed end, such as the one illustrated in FIG. 5 and described earlier. The cylindrical and coaxial plates of the irradiation section 112 are connected to a triode oscillator 113 or the like which is set so as to generate radio waves having a frequency comprised between 6 and 915 MHz. The frequency and power of the electromagnetic field are selected according to the composition and bacterial concentration present in the product, which is determined beforehand by means of a sampling of bacterial swabs.

By virtue of the relatively long wavelength of the radio waves emitted by the irradiation section, the apparatus does not require a specific shielding for environmental safety purposes, with the consequence of limiting the complexity and cost of the facility and of allowing its use in conventional installations without risks for the assigned personnel.

As previously mentioned, the output product, from the irradiation section 112, is conveyed to the secondary circuit of the preheater 107 so as to recover part of the irradiation heat. The output product, from the secondary circuit of the preheater, cooled to approximately 30°÷35° C., is then fed into the main circuit of a cooling unit 114 which uses a mixture of water and glycol, kept at approximately 0° C. by an adapted chiller, as cooling fluid. The product, cooled to a final temperature of approximately 15° C. is conveyed through the pipe portion 115 toward the collecting container 102, from which it is drawn in order to be packaged in adapted containers and packages.

Conveniently, according to the invention, after the irradiation section 112 there is a region for maintaining the irradiated product at a substantially constant temperature, in order to allow the completion of the process for the destruction of the bacterial loads. Said maintenance region can be constituted by a substantially U-shaped pipe 120 with appropriately insulated outgoing and return branches 121 and 122. By varying the length of the branches 121 and 122 it is possible to change the maintenance time, which can be comprised between 10 seconds and 1 minute depending on the persistence and concentration of the pathogenic microorganisms.

At the exit of the portion 122 of the maintenance region 120 there is a temperature detector 125 which sends an electric signal to a control unit 126 of the oscillator 113 so as to keep the final temperature of the irradiated product below 50° C. An auxiliary cooling unit, not illustrated in the drawings, can optionally be provided between each turn of the dielectric duct of the irradiation section in order to ensure that the preset maximum temperature is never exceeded.

According to a further aspect of the invention, a tube portion 106' branches from the shunt valve 105 and directly conveys the product toward a second dielectric coiled portion of the tube which is arranged within the irradiation section 112. Said portion of the circuit is activated in order to perform, when required, a preventive treatment which is suitable for breaking the persistent bacterial masses and clots which are present, for example, in heavily contaminated milk.

The apparatus of FIG. 6 allows to raise the temperature of the product with conventional thermal methods up to values proximate to the maximum temperature of the treatment, which is reached by means of an irradiation of radio waves having a limited power, with relatively low frequencies and with relatively long times comprised between 10 seconds and 1 minute and in any case markedly lower than those of conventional thermal devices.

The destructive energy used in the form of electromagnetic radiation thus constitutes a low percentage of the total energy transmitted to the product, minimizing the risks arising from the use of this form of energy which, next to its undeniable advantages, also has some environmental risks which must not be underestimated.

The apparatus according to the invention can integrate, or be arranged after, a fully conventional sterilization and/or pasteurization system in order to improve its operation.

I claim:

1. Apparatus for continuous sterilization and/or pasteurization of a biological and alimentary product containing bacterial and sporal loads, particularly in the liquid or viscous state, comprising:

a tank for holding product to be treated;

a container for collecting treated product;

a conduit, connecting said tank and said container so that product may flow from said tank to said container;

irradiation means, including at least one pair of facing emitting surfaces, for irradiating product confined within an irradiation region of the conduit with a high-frequency oscillating electromagnetic field;

means for adjusting the energy and frequency of the electromagnetic field and the irradiation time according to the composition and concentration of the bacterial loads; and an oscillator, having an output connected to said at least one pair of facing emitting surfaces, operating in a range of radio frequencies below 1 GHz;

wherein said irradiation means is set so as to heat the product to a maximum temperature of approximately 50° C.;

wherein said conduit in said irradiation region includes a dielectric-wall conduit having a wall made of a dielectric material whose resistivity is lower than that of the active principles which are responsible for the organic and organoleptic properties of the product to be treated; and wherein said conduit has a thermally insulated region, downstream of said irradiation region, whereby the product may be maintained at the maximum temperature of the treatment for a predetermined time sufficient to ensure the complete destruction of the bacterial and sporal loads contains in the product.

2. Apparatus according to claim 1, wherein said facing emitting surfaces of said irradiation means have a generally cylindrical shape and are arranged coaxially so as to define at least one open interspace between them, said open interspace substantially having the shape of a torus.

3. Apparatus according to claim 1, wherein said facing emitting surfaces of said irradiation means have a substantially planar shape and are arranged in parallel so as to define at least one open interspace between them, that open interface having substantially the shape of a prism.

4. Apparatus according to claim 1, wherein said facing emitting surfaces of said irradiation means have a generally cylindrical shape and are arranged coaxially so as to define at least one open interspace between them, and said dielectric-wall conduit is substantially spiral-shaped and is located in the at least one open interspace.

5. Apparatus according to claim 1, wherein said thermally insulated region of said conduit includes a substantially U-shaped thermally insulated tube, said tube having a length which may be adjusted according to the type and concentration of the bacterial loads contained in the product to be treated.

6. Apparatus according to claim 4, further comprising at least one heat exchanger having a first fluid passageway forming a portion of said conduit upstream of said irradiation means and a second fluid passageway, in thermal communication with said first passageway, forming a portion of said fluid conduit downstream of said irradiated means, so that heat from irradiated product flowing from said irradiation means may be provided to preheat the product flowing to said irradiation means.

7. Apparatus according to claim 1, wherein said irradiation means include pre-conditioning means, having at least one pair of pre-conditioning facing emitting surfaces within the electromagnetic field of the irradiation means and a pre-conditioning dielectric-wall conduit located in an interspace defined by said pre-conditioning facing emitting surfaces, for breaking up the bacterial clots contained in the product to be treated.

8. Apparatus for continuous sterilization and/or pasteurization of a biological and alimentary product containing bacterial and sporal loads, particularly in the liquid or viscous state, comprising:

a tank for holding product to be treated;

a container for collecting treated product;

a conduit, connecting said tank and said container so that product may flow from said tank to said container, said conduit including an irradiation region having a dielectric-wall conduit with a wall made of a dielectric material whose resistivity is lower than that of the active components which are responsible for the organic and organoleptic properties of the product to be treated, and a thermally insulated region;

irradiation means, including at least one pair of facing emitting surfaces, for irradiating product confined within an irradiation region of the conduit with a high-frequency oscillating electromagnetic field;

an oscillator, having an output connected to said at least one pair of facing emitting surfaces, operating in a range of radio frequencies below 1 GHz;

means for adjusting the energy and frequency of the electromagnetic field and the irradiation time;

means for measuring a temperature of product flowing through said conduit; and means, responsive to said means for measuring, for maintaining a measured product temperature of approximately 50° C. by controlling said means for adjusting;

whereby the product may be maintained at the maximum temperature of the treatment for a predetermined time sufficient to ensure the complete destruction of the bacterial and sporal loads contained in the product.

* * * * *